United States Patent
Smyth, IV et al.

(10) Patent No.: US 8,653,990 B2
(45) Date of Patent: Feb. 18, 2014

(54) STALL MANAGEMENT SYSTEM

(75) Inventors: Joseph Michael Smyth, IV, Bellevue, WA (US); Frank J. Lyman, Normandy Park, WA (US)

(73) Assignee: The Boeing Company, Chicago, IL (US)

(*) Notice: Subject to any disclaimer, the term of this patent is extended or adjusted under 35 U.S.C. 154(b) by 25 days.

(21) Appl. No.: 13/526,198

(22) Filed: Jun. 18, 2012

(65) Prior Publication Data

US 2013/0335243 A1     Dec. 19, 2013

(51) Int. Cl.
*G08B 23/00*     (2006.01)
*B64C 13/18*     (2006.01)

(52) U.S. Cl.
USPC .............................. 340/967; 340/966; 244/181

(58) Field of Classification Search
USPC .............. 340/963, 966–970, 974, 975; 244/5, 244/181, 227; 701/5, 6
See application file for complete search history.

(56) References Cited

U.S. PATENT DOCUMENTS

| | | | | |
|---|---|---|---|---|
| 4,235,104 A | * | 11/1980 | Hoadley et al. | 73/180 |
| 4,908,619 A | * | 3/1990 | Bala et al. | 340/966 |
| 4,910,513 A | * | 3/1990 | Kelly et al. | 340/966 |
| 5,136,518 A | * | 8/1992 | Glover | 701/5 |
| 5,225,829 A | * | 7/1993 | Bateman | 340/967 |
| 6,325,333 B1 | * | 12/2001 | Najmabadi et al. | 244/181 |
| 6,982,655 B2 | * | 1/2006 | Vialleton et al. | 340/969 |
| 2009/0015437 A1 | | 1/2009 | Campagne et al. | |
| 2011/0193724 A1 | | 8/2011 | Cases et al. | |

* cited by examiner

*Primary Examiner* — Van T. Trieu
(74) *Attorney, Agent, or Firm* — Yee & Associates, P.C.

(57) ABSTRACT

A method and system for indicating a potential stall condition for an aircraft during flight. An alert lift coefficient is identified for the aircraft. The alert lift coefficient is adjusted in response to a number of changes in a current state of the aircraft. A set of thresholds is identified for use in generating an alert indicating that the aircraft has reached the potential stall condition using the alert lift coefficient.

20 Claims, 11 Drawing Sheets

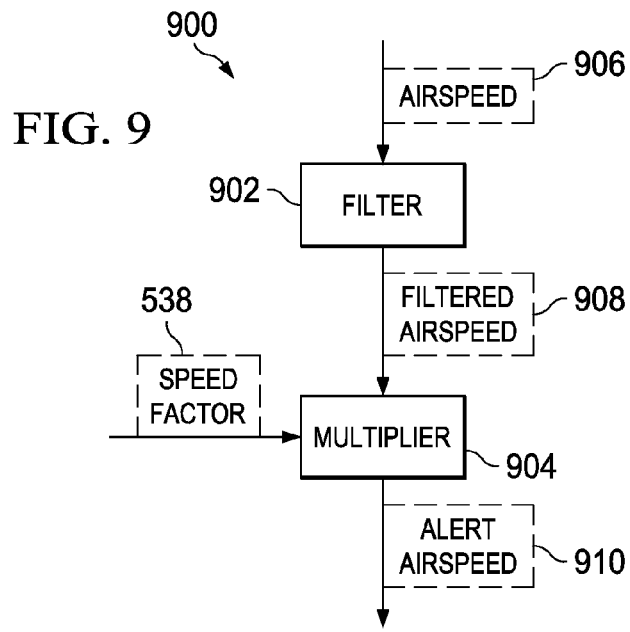
FIG. 9
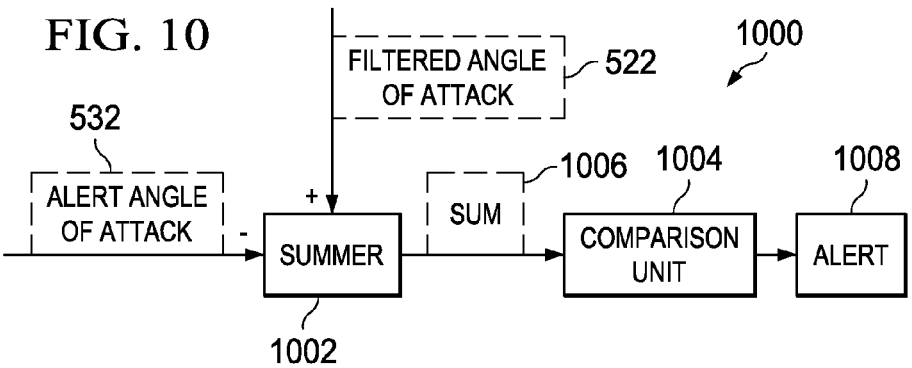
FIG. 10
FIG. 11
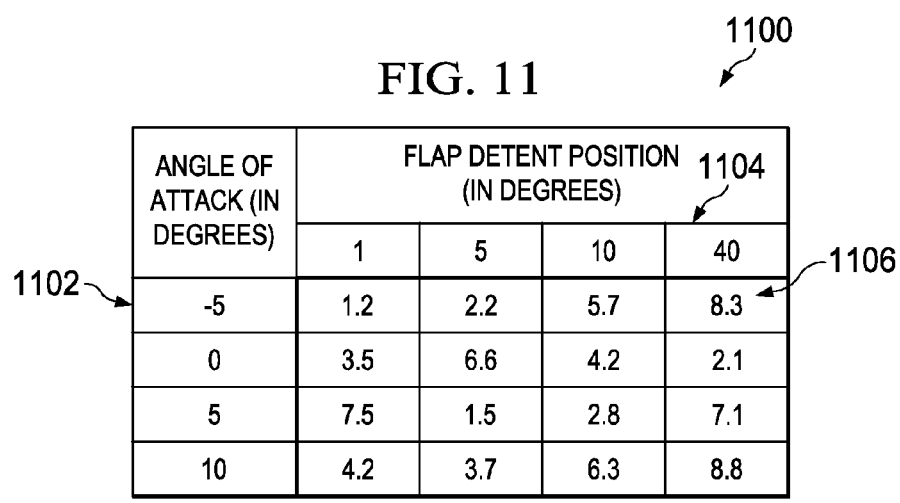

STALL MANAGEMENT SYSTEM

GOVERNMENT LICENSE RIGHTS

This application was made with United States Government support under contract number N00019-04-C-3146 awarded by the Department of Defense. The United States Government has certain rights in this application.

BACKGROUND INFORMATION

1. Field

The present disclosure relates generally to aircraft and, in particular, to managing the flight of an aircraft. Still more particularly, the present disclosure relates to a method and apparatus for identifying a condition at which an aircraft may potentially stall given a current state of the aircraft during flight.

2. Background

The state of an aircraft during flight is determined by a number of factors. These factors may include, for example, without limitation, the speed of the aircraft, the size of the aircraft, the shape of the aircraft, the shape of the wings of the aircraft, the angle of attack of the aircraft, and other types of factors. In some cases, the maneuvering capabilities of the aircraft may change in response to changes in the state of the aircraft during flight.

For example, an aircraft may stall if the angle of attack of the aircraft increases in a manner that causes an amount of lift generated by the aircraft during flight to decrease. As used herein, "lift" is the force generated when air flows over an aircraft during flight. This force directly opposes the weight of the aircraft and holds the aircraft in air.

The particular angle of attack at which the lift generated by the aircraft decreases may vary for different types of aircraft. The angle of attack at which an aircraft can potentially stall may be based on factors such as, for example, without limitation, the profile of the wings of the aircraft, the planform of the wings, the aspect ratio of the wings, and other factors. Further, the angle of attack at which an aircraft can potentially stall corresponds to a particular speed for the aircraft. This speed may be referred to as a "stall speed".

Some currently available commercial aircraft use an alert system that generates an alert when the speed of the aircraft falls below an alert speed, which is greater than the stall speed by some selected amount. This alert speed may also be referred to as a "minimum speed". In particular, when the speed of the aircraft is less than the alert speed, an alert is generated such that an operator of the aircraft may take action to prevent or at least reduce the possibility of the aircraft stalling.

The stall speed of an aircraft may determine the maneuvering capabilities of the aircraft. For example, the stall speed may determine the minimum distances required for takeoff and landing by the aircraft. These distances are referred to as the takeoff distance and landing distance, respectively, for the aircraft. The takeoff distance and landing distance for an aircraft are determined by the slowest speeds at which the aircraft is capable of flying during takeoff and landing without stalling. The takeoff and landing speeds for an aircraft may be required to be greater than or equal to the alert speed of the aircraft.

Consequently, the stall speed of an aircraft may affect the maneuvering capabilities of the aircraft at different airports. In particular, the length of a runway from which the aircraft takes off at an airport may need to be at least the length of the takeoff distance. Similarly, the length of the runway onto which the aircraft lands at an airport may need to be at least the length of the landing distance. The takeoff distance and landing distance for an aircraft may be reduced by decreasing the alert speed during takeoff and landing, respectively.

Additionally, the stall speed of an aircraft may affect the ability of the aircraft to maneuver at elevated bank angles with respect to different load factors. For example, the turn radius of the aircraft may be determined by the speed of the aircraft and the maximum bank angle at which the aircraft can fly while staying at, and/or above, the alert speed. In particular, the minimum maneuvering speed at which the aircraft can fly with respect to a selected load factor for the aircraft is required to be greater than the alert speed at the selected load factor.

The takeoff distance and landing distance for an aircraft may be set by various regulations, such as those defined by the Federal Aviation Administration. Some currently used alert systems are conservative with respect to alert speed. For example, with these types of alert systems, alerts may be generated at higher alert speeds to increase safety in operating the aircraft. However, these higher alert speeds may cause some aircraft to be unable to operate at some airports. Therefore, it would be desirable to have a method and apparatus that takes into account at least some of the issues discussed above as well as possibly other issues.

SUMMARY

In one illustrative embodiment, a method for managing an aircraft during flight is provided. An alert angle of attack is identified for the aircraft using a previously identified alert speed for the aircraft. An alert lift coefficient is identified for the aircraft using the alert angle of attack for the aircraft. An alert speed is identified for the aircraft using the alert lift coefficient for the aircraft and a current lift coefficient for the aircraft.

In another illustrative embodiment, a method is provided for indicating a potential stall condition for an aircraft during flight. An alert lift coefficient is identified for the aircraft. The alert lift coefficient is adjusted in response to a number of changes in a current state of the aircraft. A set of thresholds are identified for use in generating an alert indicating that the aircraft has reached the potential stall condition using the alert lift coefficient.

In yet another illustrative embodiment, a stall management system comprises a threshold generator. The threshold generator is configured to identify an alert angle of attack for an aircraft using a previously identified alert speed for the aircraft. The threshold generator is configured to identify an alert lift coefficient for the aircraft using the alert angle of attack for the aircraft. The threshold generator is configured to identify an alert speed for the aircraft using the alert lift coefficient for the aircraft and a current lift coefficient for the aircraft.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 9 is an illustration of logic for identifying an alert speed in accordance with an illustrative embodiment;

FIG. 10 is an illustration of logic for generating an alert in accordance with an illustrative embodiment;

FIG. 11 is an illustration of a table for identifying a lift coefficient in accordance with an illustrative embodiment;

DETAILED DESCRIPTION

Figure 1:
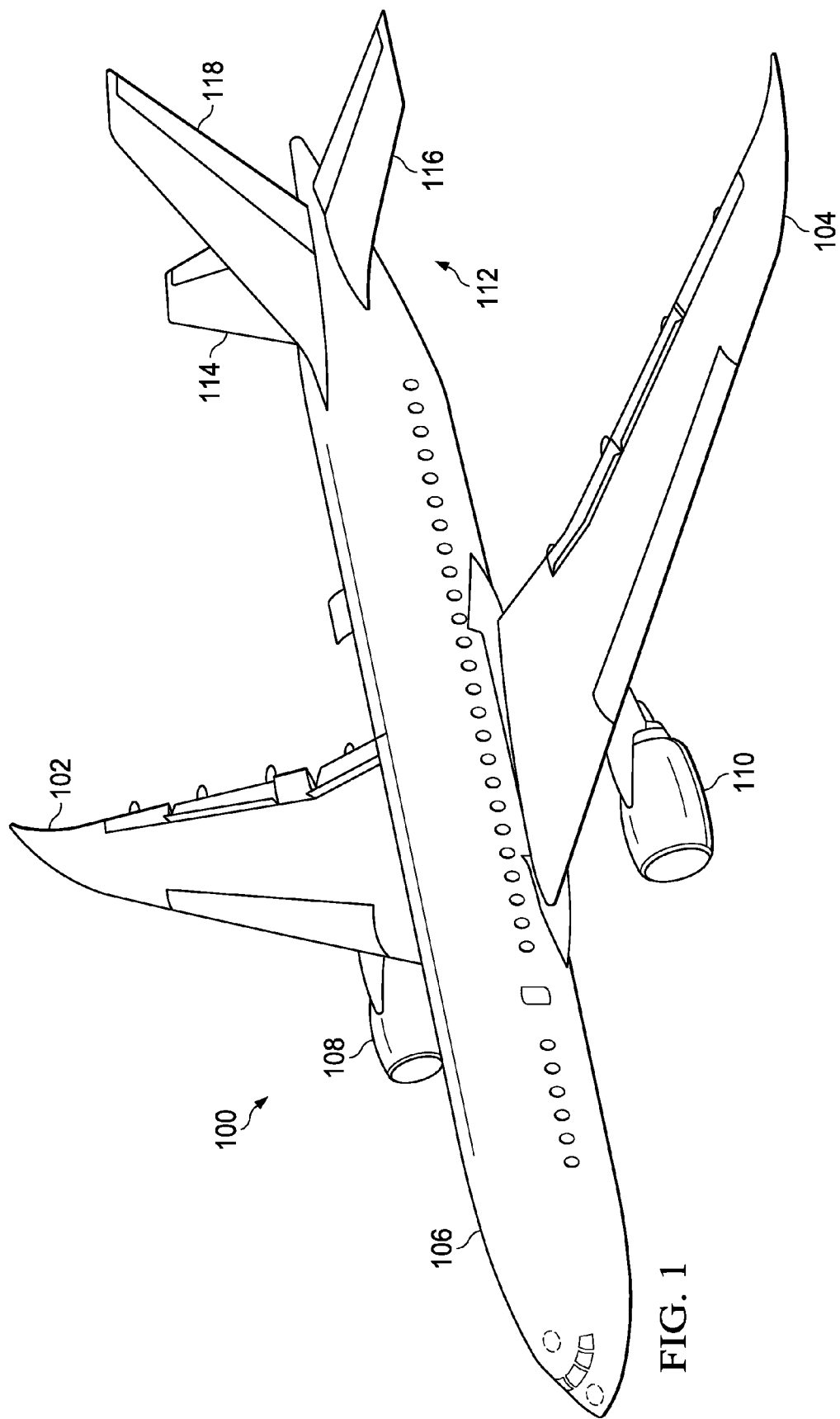
FIG. 1 is an illustration of an aircraft in accordance with an illustrative embodiment

The illustrative embodiments recognize and take into account one or more considerations. For example, the illustrative embodiments recognize and take into account that with some currently available alert systems, the alert speeds used for generating alerts are based on an assumption that the lift generated by the aircraft remains substantially constant during flight. In other words, a fixed alert lift coefficient is used to identify the alert speed for an aircraft. This fixed alert lift coefficient may be some selected amount lower than the predicted stall lift coefficient for the aircraft. However, the illustrative embodiments recognize and take into account that the actual lift coefficient for an aircraft may change as the state of the aircraft changes during flight. Further, the stall speed of an aircraft may change as the lift coefficient for the aircraft changes.

For example, the lift coefficient for a selected angle of attack may decrease as a Mach number of the aircraft increases. As used herein, the Mach number of an aircraft represents the speed of the aircraft through the air divided by the local speed of sound. The Mach number of an aircraft may vary based on the conditions of the air around the aircraft. These conditions may include, for example, temperature and/or pressure.

The illustrative embodiments recognize and take into account that the fixed alert lift coefficient used by some currently available alert systems may correspond to alert speeds that are higher than needed for takeoff and landing. Further, the illustrative embodiments recognize and take into account that in some cases during flight, the alert speed identified using a fixed alert lift coefficient may be lower than the stall speed of the aircraft. Consequently, an alert may not be generated before the aircraft has reached the stall speed of the aircraft. Without this alert, an operator of the aircraft may inadvertently stall the aircraft while performing the maneuvers needed to accomplish a mission.

Additionally, the different illustrative embodiments recognize and take into account that some currently used alert systems generate alerts based on the angle of attack of the aircraft. For example, these alert systems may generate an alert when the angle of attack of the aircraft is higher than an alert angle of attack. The illustrative embodiments recognize and take into account that the alert angle of attack used by these currently used alert systems may not take into account changes in the stall lift coefficient of the aircraft and/or state of the aircraft.

Thus, the illustrative embodiments provide a method and apparatus for identifying an alert speed for the aircraft with a desired level of accuracy. In particular, the different illustrative embodiments provide a stall management system configured to identify an alert speed for the aircraft based on an alert lift coefficient for the aircraft that may change in response to the state of the aircraft changing. In one illustrative embodiment, a method for managing the flight of an aircraft is provided. An alert angle of attack for the aircraft is identified using a feedback alert speed for the aircraft. An alert lift coefficient is identified using the alert angle of attack. The alert speed for the aircraft is calculated using the alert lift coefficient and a corrected lift coefficient for the aircraft. The alert speed is used as the feedback alert speed in identifying the alert angle of attack.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104. Body 106 has tail section 112. Horizontal stabilizer 114, horizontal stabilizer 116, and vertical stabilizer 118 are attached to tail section 112 of body 106.

Aircraft 100 is an example of an aircraft in which a stall management system may be implemented in accordance with an illustrative embodiment. The stall management system may be used to identify an alert speed for the aircraft that may change in response to the state of the aircraft changing. In particular, the stall management system uses a lift coefficient that changes based on changes in the state of the aircraft during flight. As a result, this stall management system may be capable of identifying an alert speed that takes into account changes in the state of the aircraft during flight and remains above the stall speed of the aircraft at all times.

Further, when using a variable alert lift coefficient, an alert speed that is less conservative than the alert speed identified using a fixed alert lift coefficient may be identified. In other words, the alert speed identified using the variable alert lift coefficient may be lower than the alert speed identified using the fixed alert lift coefficient. Consequently, the maneuvering capabilities of the aircraft may be increased. In particular, an operator may be able to perform more maneuvers with the aircraft prior to receiving an alert. Additionally, the takeoff distance and landing distance required by the aircraft may be reduced such that the aircraft may be operated at an increased number of airports.

Figure 2:
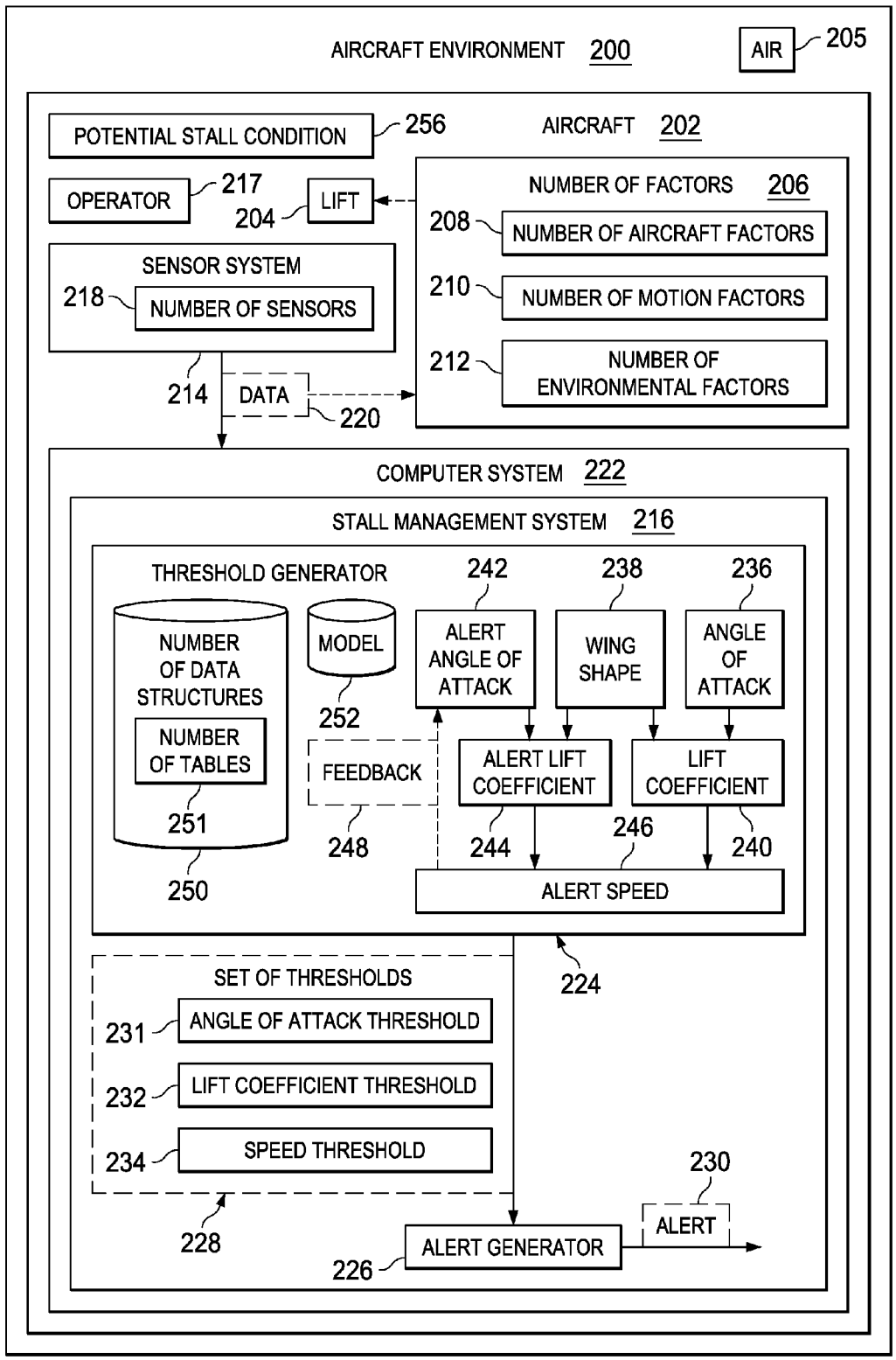
FIG. 2 is an illustration of an aircraft in an aircraft environment in the form of a block diagram in accordance with an illustrative embodiment.

Turning now to FIG. 2, an illustration of an aircraft in an aircraft environment in the form of a block diagram is depicted in accordance with an illustrative embodiment. In this illustrative example, aircraft environment 200 includes aircraft 202. Aircraft 100 in FIG. 1 is an example of one implementation for aircraft 202 shown in block form in FIG. 2.

As depicted, aircraft 202 generates lift 204 during flight through air 205. Lift 204 may be affected by number of factors 206 during flight of aircraft 202. As used herein, a "number of" items means one or more items. For example, number of factors 206 may be one or more lift factors. Number of factors 206 may include at least one of number of aircraft factors 208, number of motion factors 210, and number of environmental factors 212.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; or some other suitable combination.

Number of aircraft factors 208 may include one or more factors related to the size and/or shape of aircraft 202. Number of motion factors 210 may include one or more factors related to the motion of aircraft 202 through air 205. Further, number of environmental factors 212 may include one or more factors related to air 205.

In these illustrative examples, aircraft 202 comprises sensor system 214 and stall management system 216. Sensor system 214 is configured to monitor number of factors 206, while stall management system 216 is configured to alert operator 217 of aircraft 202 that an undesirable situation may occur during the flight of aircraft 202 based on number of factors 206.

As depicted, sensor system 214 comprises number of sensors 218. Number of sensors 218 may include, for example, without limitation, at least one of an angle of attack indicator, a position sensor, a temperature sensor, a motion sensor, and other suitable types of sensors.

Number of sensors 218 may be configured to generate data 220 for at least a portion of number of factors 206. Data 220 may include, for example, without limitation, values for number of factors 206. In some cases, at least a portion of data 220 may be generated continuously in substantially real-time. In other examples, a portion of data 220 may be generated at specified time intervals.

Stall management system 216 is configured to receive data 220 from sensor system 214. Stall management system 216 is configured to identify limitations for the flight of aircraft 202 using data 220 such that the possibility of aircraft 202 stalling during flight may be reduced.

In these illustrative examples, stall management system 216 may be implemented using hardware, software, or a combination of the two. For example, stall management system 216 may be implemented in computer system 222. Computer system 222 may comprise one or more computers. When more than one computer is present, these computers may be in communication with each other over a communications medium, such as, for example, a network.

As depicted, stall management system 216 comprises threshold generator 224 and alert generator 226. In these illustrative examples, threshold generator 224 is configured to generate set of thresholds 228 using data 220 received from sensor system 214. As used herein, a "set of" items means one or more items. For example, set of thresholds 228 may comprise one or more alert thresholds. Alert generator 226 may generate alert 230 when one or more thresholds in set of thresholds 228 are crossed.

In these illustrative examples, set of thresholds 228 may include at least one of angle of attack threshold 231, lift coefficient threshold 232, and speed threshold 234. Angle of attack threshold 231 is an angle of attack that is less than the critical angle of attack for aircraft 202 by some selected amount. The critical angle of attack is the angle of attack at which aircraft 202 may stall given the current state of aircraft 202 during flight.

Lift coefficient threshold 232 is a lift coefficient that is lower than the stall lift coefficient for aircraft 202 by some selected amount. The stall lift coefficient is the lift coefficient at which aircraft 202 may stall given the current state of aircraft 202 during flight.

Further, speed threshold 234 is a speed that is higher than a stall speed for aircraft 202. The stall speed is the speed at which aircraft 202 may stall given the current state of aircraft 202. Speed threshold 234 may be represented in a number of different ways. For example, speed threshold 234 may be expressed in knots, miles per hour, Mach number, or some other type of representation of speed.

Set of thresholds 228 may be generated in a number of different ways. In one illustrative example, threshold generator 224 uses data 220 to identify angle of attack 236 and wing shape 238. As used herein, angle of attack 236 is the angle between the chord lines of the wings of aircraft 202 and the vector representing the relative motion between aircraft 202 and air 205. The chord line of a wing, as used herein, is an imaginary straight line between the trailing edge of the wing and the center of curvature of the leading edge of the cross-section of wing shape 238.

In these examples, wing shape 238 may also be referred to as "airfoil" or "wing configuration". Wing shape 238 may include the shape of a wing on aircraft 202 and any flaps, slats, and/or other control surfaces attached to the wing.

Threshold generator 224 uses angle of attack 236 and wing shape 238 to identify lift coefficient 240 for aircraft 202. Lift coefficient 240 is a current lift coefficient for aircraft 202. Further, threshold generator 224 uses wing shape 238 and alert angle of attack 242 to identify alert lift coefficient 244. Alert angle of attack 242 may be identified by threshold generator 224 using feedback 248.

In some illustrative examples, alert lift coefficient 244 may be identified in a manner such that alert lift coefficient 244 is always substantially a selected percentage lower than the current stall lift coefficient for aircraft 202. In some cases, this selected percentage may be about five percent, ten percent, or some other selected percentage. In this manner, when the stall lift coefficient for aircraft 202 changes based on changes in the state of aircraft 202, lift coefficient threshold 232 also changes.

In this illustrative example, alert lift coefficient 244 and lift coefficient 240 are used to identify alert speed 246. Alert speed 246 may be used as feedback 248 for identifying a next alert angle of attack 242. The next alert angle of attack 242 is the angle of attack for aircraft 202 at a point in time later than the current point in time. Consequently, feedback 248 used to identify alert angle of attack 242 is a previously identified alert speed 246 in this illustrative example. In this manner, alert angle of attack 242 and alert lift coefficient 244 may be adjusted based on a number of changes to the current state of aircraft 202 during flight. These changes may include changes to one or more of number of factors 206.

In some illustrative examples, alert speed 246 may be identified for a particular maneuver for aircraft 202. For example, alert speed 246 may be identified for a turning maneuver for aircraft 202 in which aircraft 202 flies at a bank angle greater than about zero degrees. This alert speed may be different than the alert speed for aircraft 202 during substantially level flight.

Threshold generator 224 may use number of data structures 250 and/or model 252 in identifying lift coefficient 240, alert angle of attack 242, alert lift coefficient 244, alert speed 246, and/or other types of parameters. Number of data structures 250 may take the form of, for example, without limitation, number of tables 251. Of course, in other illustrative examples, a data structure in number of data structures 250 may comprise at least one of a database, a table, a flat file, a linked list, a spreadsheet, a model, an associative memory, or some other suitable type of data structure. Model 252 may comprise, for example, without limitation, any number of equations, algorithms, and/or processes for calculating values for these parameters.

Threshold generator 224 may use at least one of alert angle of attack 242, alert lift coefficient 244, and alert speed 246 as angle of attack threshold 231, lift coefficient threshold 232, and speed threshold 234, respectively, to form set of thresholds 228. Threshold generator 224 sends set of thresholds 228 to alert generator 226.

Depending on the implementation, threshold generator 224 may generate set of thresholds 228 continuously during the flight of aircraft 202, in response to the occurrence of a periodic event and/or a non-periodic event. Further, set of thresholds 228 may take into account changes in the state of aircraft 202 during flight with respect to number of factors 206. Additionally, set of thresholds 228 may take into account maneuvers, such as turns, that are performed by aircraft 202. In this manner, set of thresholds 228 may be dynamically identified for aircraft 202 during flight.

Alert generator 226 may use at least one of angle of attack threshold 231, lift coefficient threshold 232, and speed threshold 234 in set of thresholds 228 to form alert 230. In these illustrative examples, alert 230 may take the form of at least one of a visual alert, an audible alert, a tactile alert, and some other type of alert. Alert 230 indicates potential stall condition 256. In particular, alert 230 may indicate that aircraft 202 has reached potential stall condition 256. When aircraft 202 reaches potential stall condition 256, aircraft 202 may be close to stalling. For example, when aircraft 202 is in potential stall condition 256, aircraft 202 may be approaching at least one of the critical angle of attack, stall lift coefficient, and/or stall speed for aircraft 202.

Alert 230 may be generated in a manner that is detected by operator 217 of aircraft 202. Operator 217 of aircraft 202 may perform any number of maneuvers to prevent or reduce the possibility of aircraft 202 stalling.

In this manner, the illustrative embodiments provide a system for managing the flight of aircraft 202. In particular, stall management system 216 allows operator 217 of aircraft 202 to be presented alert 230 indicating potential stall condition 256 more accurately as compared to some currently available stall management systems. Further, stall management system 216 may increase a range of speeds at which aircraft 202 may operate, the number of maneuvers that may be performed by aircraft 202, or both increase a range of speeds at which aircraft 202 may operate and increase the number of maneuvers that may be performed by aircraft 202. This increase in at least one of range of speeds and maneuvers may be provided by the updating of set of thresholds 228 for generating alert 230 based on the current state of aircraft 202.

Figure 3:
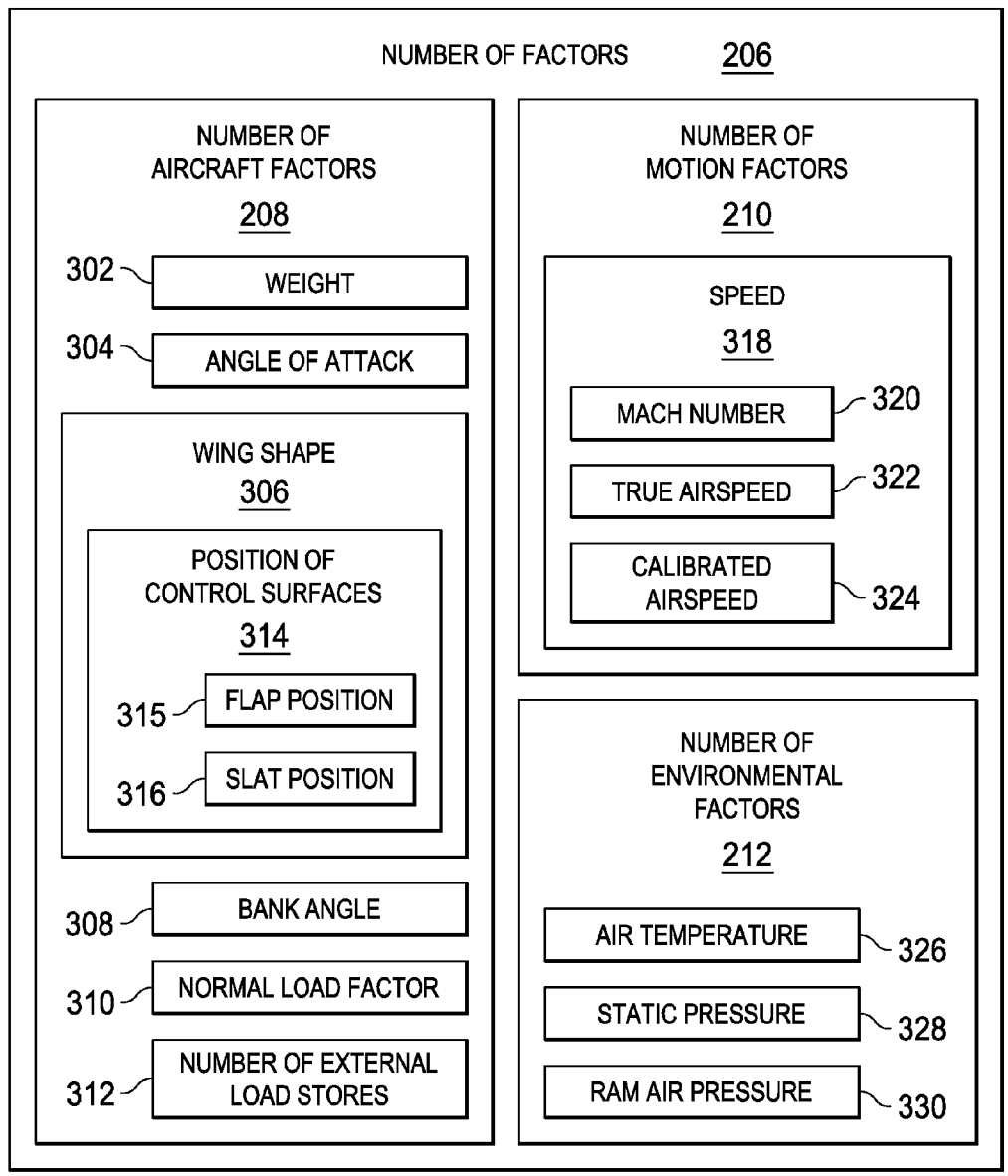
FIG. 3 is an illustration of a number of factors that affect the lift created by an aircraft in the form of a block diagram in accordance with an illustrative embodiment.

With reference now to FIG. 3, an illustration of number of factors 206 that affect lift 204 created by aircraft 202 in the form of a block diagram is depicted in accordance with an illustrative embodiment. As depicted, number of factors 206 may include number of aircraft factors 208, number of motion factors 210, and number of environmental factors 212.

In these illustrative examples, number of aircraft factors 208 may include at least one of weight 302, angle of attack 304, wing shape 306, bank angle 308, normal load factor 310, and number of external stores 312. Initially, weight 302 may be the gross weight of aircraft 202 in FIG. 2 at takeoff. Weight 302 may change as the flight of aircraft 202 progresses. For example, weight 302 may change as more fuel is consumed during flight.

Angle of attack 304 may be the angle between the chord lines of the wings of aircraft 202 and the vector representing the relative motion between aircraft 202 and air 205 in FIG. 2. Data 220 about angle of attack 304 may include one or more measurements taken from one or more angle of attack vanes on aircraft 202. Threshold generator 224 in FIG. 2 may use these measurements to calculate angle of attack 236 in FIG. 2. For example, threshold generator 224 may make corrections to the measurements generated by the one or more angle of attack vanes based on the distance from these angle of attack vanes to the center of gravity for aircraft 202. In this manner, angle of attack 236 in FIG. 2 may be a corrected angle of attack.

In these illustrative examples, wing shape 306 of aircraft 202 may be based on, for example, without limitation, position of control surfaces 314 attached to one or more wings of aircraft 202. The control surfaces attached to these wings may include, for example, flaps, slats, and/or other suitable types of control surfaces. In one illustrative example, wing shape 306 of aircraft 202 may be based on at least one of flap position 315 and slat position 316. Flap position 315 is a position of a flap on a wing of aircraft 202. Slat position 316 is a position of a slat on aircraft 202.

Bank angle 308 is an angle at which aircraft 202 is inclined about a longitudinal axis through the fuselage of aircraft 202 relative to the path of aircraft 202. Normal load factor 310 is a vertical load on aircraft 202 and may be measured in units of g. Number of external stores 312 may be one or more components attached to the wing, fuselage, or some other portion of aircraft 202 that may cause a change in lift 204. These components may include, for example, without limitation, at least one of an external fuel tank, a storage pod, a pylori, and some other types of components.

As depicted, number of motion factors 210 may include speed 318. Speed 318 may be represented as at least one, for example, of Mach number 320, true airspeed 322, and calibrated airspeed 324. Of course, in other illustrative examples, speed 318 may be represented as indicated airspeed, equivalent airspeed, or some other measure of speed.

Number of environmental factors 212 may include at least one of air temperature 326, static pressure 328, and ram air pressure 330. Air temperature 326 is the temperature of air 205 outside of aircraft 202. Static pressure 328 is the pressure measured within a port of a device such as a pitot-static tube in aircraft 202 or a flush static port. Ram air pressure 330 is the pressure caused by air 205 moving into a pitot-static tube in aircraft 202.

The factors described in FIG. 3 are only intended as examples of some types of factors in number of factors 206 that may affect lift 204 created by aircraft 202. These examples are not meant to limit or specify the factors that may affect lift 204 and/or the factors that may be taken into account by stall management system 216 in FIG. 2.

Figure 4:
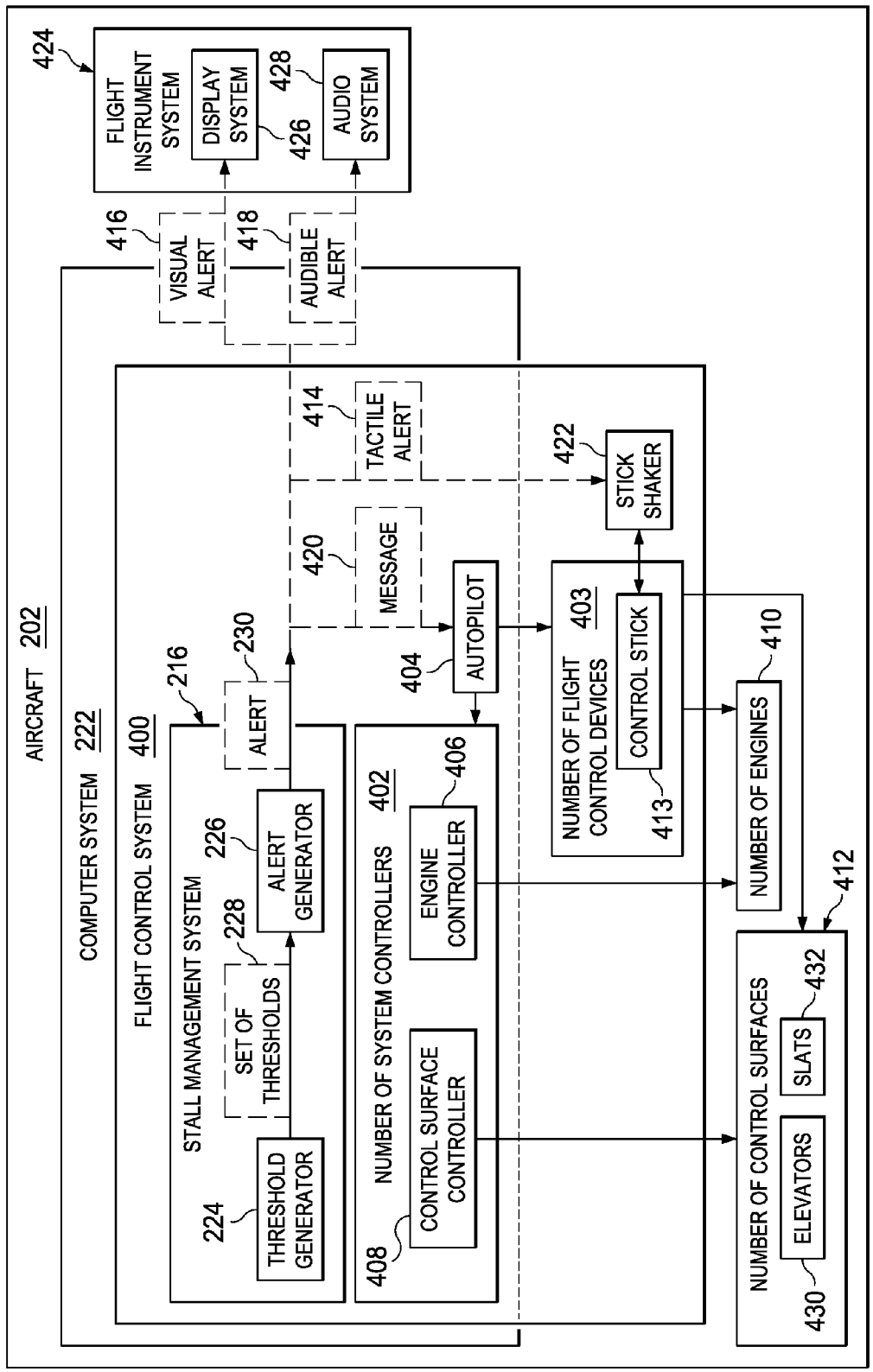
FIG. 4 is an illustration of a stall management system implemented in a flight control system in the form of a block diagram in accordance with an illustrative embodiment.

With reference now to FIG. 4, an illustration of stall management system 216 implemented in a flight control system in the form of a block diagram is depicted in accordance with an illustrative embodiment. Stall management system 216 is implemented within flight control system 400 in this illustrative example. As depicted, at least a portion of flight control system 400 may be implemented in computer system 222.

As depicted, flight control system 400 includes stall management system 216, number of system controllers 402, number of flight control devices 403, and autopilot 404. Number of system controllers 402 may be implemented using hardware, software, or a combination of the two. In one illustrative embodiment, number of system controllers 402 includes engine controller 406 and control surface controller 408.

Engine controller 406 is configured to control number of engines 410 for aircraft 202. Number of engines 410 may include one or more engines configured to provide the thrust required to move aircraft 202. Engine controller 406 may control the operation of number of engines 410. For example, engine controller 406 may control the amount of thrust generated by number of engines 410.

Control surface controller 408 is configured to control number of control surfaces 412 for aircraft 202. Number of control surfaces 412 may include one or more moveable surfaces that can be positioned to control the flight of aircraft 202. Control surface controller 408 may be configured to control the position and configuration of number of control surfaces 412.

In these illustrative examples, number of control surfaces 412 and number of engines 410 are not considered part of flight control system 400. However, in other illustrative examples, flight control system 400 may include number of control surfaces 412 and number of engines 410.

Number of flight control devices 403 may include one or more physical controls that may be used by a pilot, such as operator 217 in FIG. 2, to control the operation of aircraft 202. Control stick 413 is an example of one of number of flight control devices 403. Operator 217 may control aircraft 202 by manipulating control stick 413. In this illustrative example, number of flight control devices 403 may communicate with engine controller 406 and control surface controller 408 to control flight of aircraft 202.

Autopilot 404 is a system that is configured to control the flight of aircraft 202. For example, autopilot 404 may communicate with engine controller 406 and control surface controller 408 to control flight of aircraft 202. Autopilot 404 may control the flight of aircraft 202 based on pilot input, a flight plan, or some combination thereof.

In this illustrative example, alert 230 may be generated by alert generator 226 in a number of different forms. For example, alert 230 may comprise at least one of tactile alert 414, visual alert 416, audible alert 418, and message 420. Tactile alert 414 may be, for example, without limitation, a command that is sent to stick shaker 422. Stick shaker 422 is a device attached to control stick 413 and configured to cause control stick 413 to shake or vibrate. In particular, stick shaker 422 causes control stick 413 to shake in response to receiving tactile alert 414.

Visual alert 416 and/or audible alert 418 may be sent to flight instrument system 424 in aircraft 202. Flight instrument system 424 may comprise at least one of display system 426 and audio system 428. Display system 426 may comprise any number of display devices, monitors, touch screens, gauges, lights, and/or other types of visual indicator devices. Audio system 428 may comprise any number of speakers, microphones, and/or other types of audio devices.

Visual alert 416 may comprise, for example, at least one of a flashing color, bolding, a change in font, an animation, a flashing number, a flashing light, or some other suitable type of indicator. Audible alert 418 may be comprise, for example, without limitation, a tone, a verbal message, or some other suitable type of audible alert.

Message 420 may be sent to autopilot 404. Message 420 may comprise at least one of a request, a command, or some other suitable type of message. In response to receiving message 420, autopilot 404 is configured to automatically take action to control number of system controllers 402 and/or number of flight control devices 403 without needing input from operator 217 to prevent aircraft 202 from stalling.

For example, autopilot 404 may send commands to number of control surfaces 412 to control the configuration of one or more control surfaces. As one illustrative example, autopilot 404 may control at least one of elevators 430 and slats 432 in number of control surfaces 412 to prevent aircraft 202 from stalling. More specifically, autopilot 404 may increase the deflection of elevators 430 to decrease an angle of attack for aircraft 202. Additionally, autopilot 404 may send commands to control surface controller 408 to extend slats 432 on the leading edge of a wing in aircraft 202.

The illustrations of aircraft 202 in aircraft environment 200 in FIG. 2, number of factors 206 in FIG. 3, and flight control system 400 in FIG. 4 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, alert generator 226 and threshold generator 224 may be combined. In some illustrative examples, stall management system 216 may use only model 252 and may not use number of data structures 250. In other illustrative examples, threshold generator 224 may modify alert angle of attack 242, alert lift coefficient 244, and/or alert speed 246 to identify angle of attack threshold 231, lift coefficient threshold 232, and/or speed threshold 234, respectively.

Figure 5:
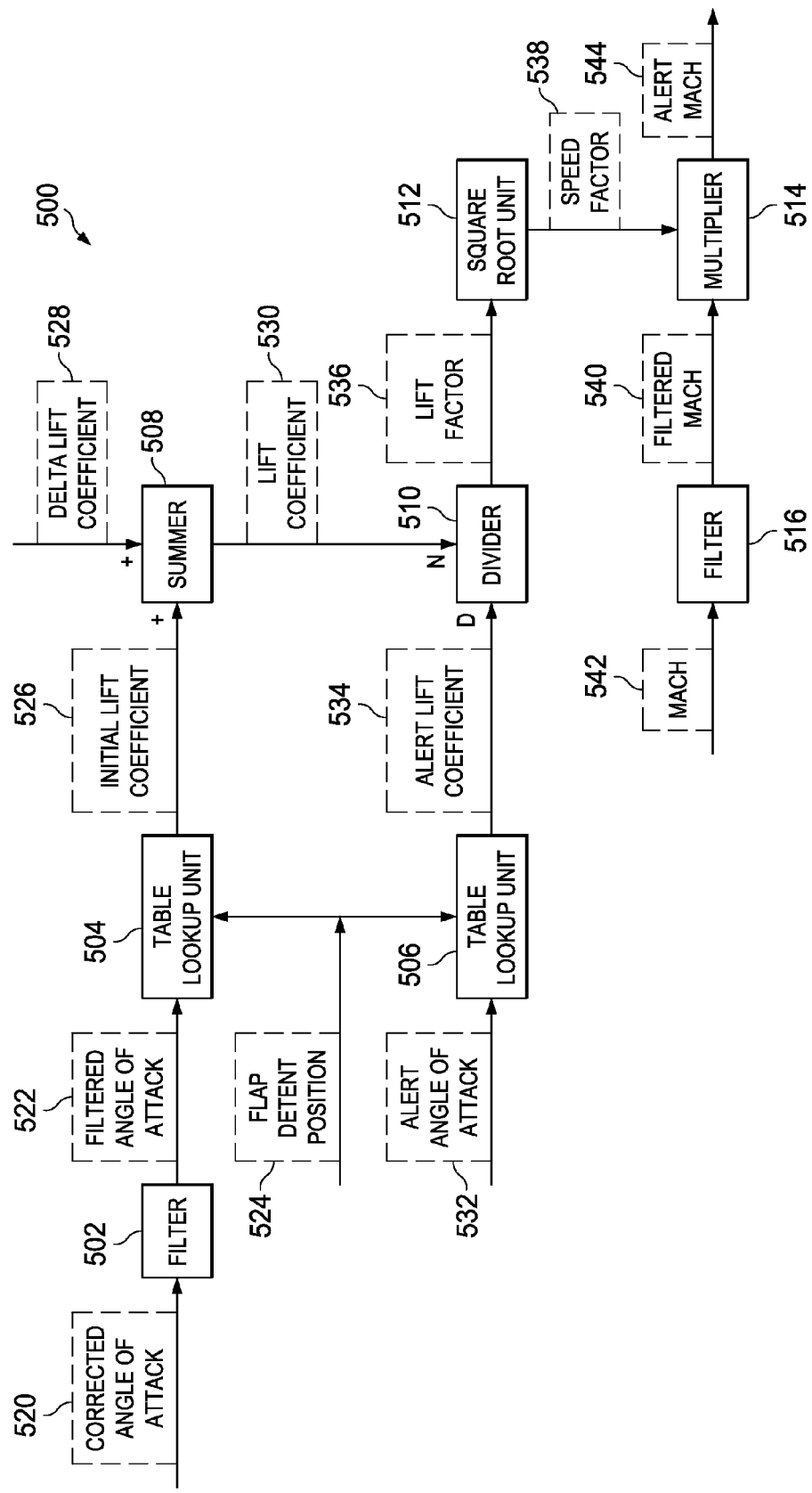
FIG. 5 is an illustration of logic for use in identifying an alert speed in accordance with an illustrative embodiment.

With reference now to FIG. 5, an illustration of logic for use in identifying an alert speed is depicted in accordance with an illustrative embodiment. In this illustrative example, logic 500 is configured to identify an alert speed, such as, for example, alert speed 246 in FIG. 2. In this illustrative example, logic 500 may be implemented in threshold generator 224 in stall management system 216 in FIG. 2.

As depicted, logic 500 includes filter 502, table lookup unit 504, table lookup unit 506, summer 508, divider 510, square root unit 512, multiplier 514, and filter 516. In this illustrative example, filter 502 receives corrected angle of attack 520 as input. Corrected angle of attack 520 is an example of one implementation for angle of attack 236 in FIG. 2. Corrected angle of attack 520 may be, for example, without limitation, the current angle of attack measurement taken from an angle of vane indicator, corrected for the pitch rate of the aircraft.

In this illustrative example, filter 502 takes the form of a low pass filter. In particular, filter 502 is a first order low pass filter. For example, filter 502 may be implemented using a Laplace transform such as $1/(0.5S+1)$ that is multiplied by corrected angle of attack 520.

Filter 502 generates filtered angle of attack 522 as an output and sends filtered angle of attack 522 into table lookup unit 504 as an input. Table lookup unit 504 also receives flap detent position 524 as an input. Flap detent position 524 is an example of one implementation for an indicator of wing shape 238 in FIG. 2. As depicted, flap detent position 524 is the current position of a flight control device that controls the configuration of the flaps attached to the wings of the aircraft, and thereby, the wing shape for the aircraft. Table lookup unit 504 uses filtered angle of attack 522, flap detent position 524, and a table to identify initial lift coefficient 526. This table may be, for example, without limitation, one of number of tables 251 in FIG. 2. In some illustrative examples, table lookup unit 504 may also use Mach 542 as an input.

Initial lift coefficient 526 is sent into summer 508 as an input along with delta lift coefficient 528. Summer 508 is configured to sum initial lift coefficient 526 and delta lift coefficient 528 to generate lift coefficient 530. Lift coefficient 530 is an example of one implementation for lift coefficient 240 in FIG. 2. In this illustrative example, delta lift coefficient 528 is a correction to initial lift coefficient 526 identified by a flight management system on the aircraft. Summer 508 sends lift coefficient 530 to divider 510.

Further, flap detent position 524 may also be sent as input into table lookup unit 506 along with alert angle of attack 532. In some illustrative examples, alert Mach 544 is an input into table lookup unit 506. Alert angle of attack 532 is an example of one implementation for alert angle of attack 242 in FIG. 2. The generation of alert angle of attack 532 is described in greater detail in FIG. 6 below.

In this illustrative example, table lookup unit 506 may use the same table used by table lookup unit 504 to identify alert lift coefficient 534 based on flap detent position 524 and alert angle of attack 532. Alert lift coefficient 534 is an example of one implementation for alert lift coefficient 244 in FIG. 2.

Alert lift coefficient 534 is sent as input into divider 510. Divider 510 is configured to divide lift coefficient 530 by alert lift coefficient 534 to generate lift factor 536. Lift factor 536 is sent as input into square root unit 512. Square root unit 512 takes the square root of lift factor 536 and generates speed factor 538. In this illustrative example, speed factor 538 is sent as input into multiplier 514 along with filtered Mach 540. Multiplier 514 multiplies filtered Mach 540 by speed factor 538 to generate alert Mach 544. In this illustrative example, alert Mach 544 is an example of one implementation for alert speed 246 in FIG. 2.

As depicted, filtered Mach 540 is generated by filter 516. In this illustrative example, filter 516 takes the form of a low pass filter. In particular, filter 516 may be a first order low pass filter. Filter 516 is configured to filter Mach 542 to generate filtered Mach 540. In these illustrative examples, Mach 542 is a representation of the current speed of the aircraft calibrated according to the air temperature outside the aircraft and pressure. In particular, Mach 542 is a current Mach for the aircraft.

In this illustrative example, at least one of alert angle of attack 532, alert lift coefficient 534, and alert Mach 544 is used as thresholds for generating an alert. For example, alert angle of attack 532 may be used as an angle of attack threshold, such as angle of attack threshold 231 in FIG. 2, such that an alert is generated whenever the aircraft has an angle of attack that is greater than alert angle of attack 532. In some cases, alert Mach 544 is used as a speed threshold, such as speed threshold 234 in FIG. 2, such that an alert is generated whenever the aircraft reaches a speed that is below alert Mach 544.

Figure 6:
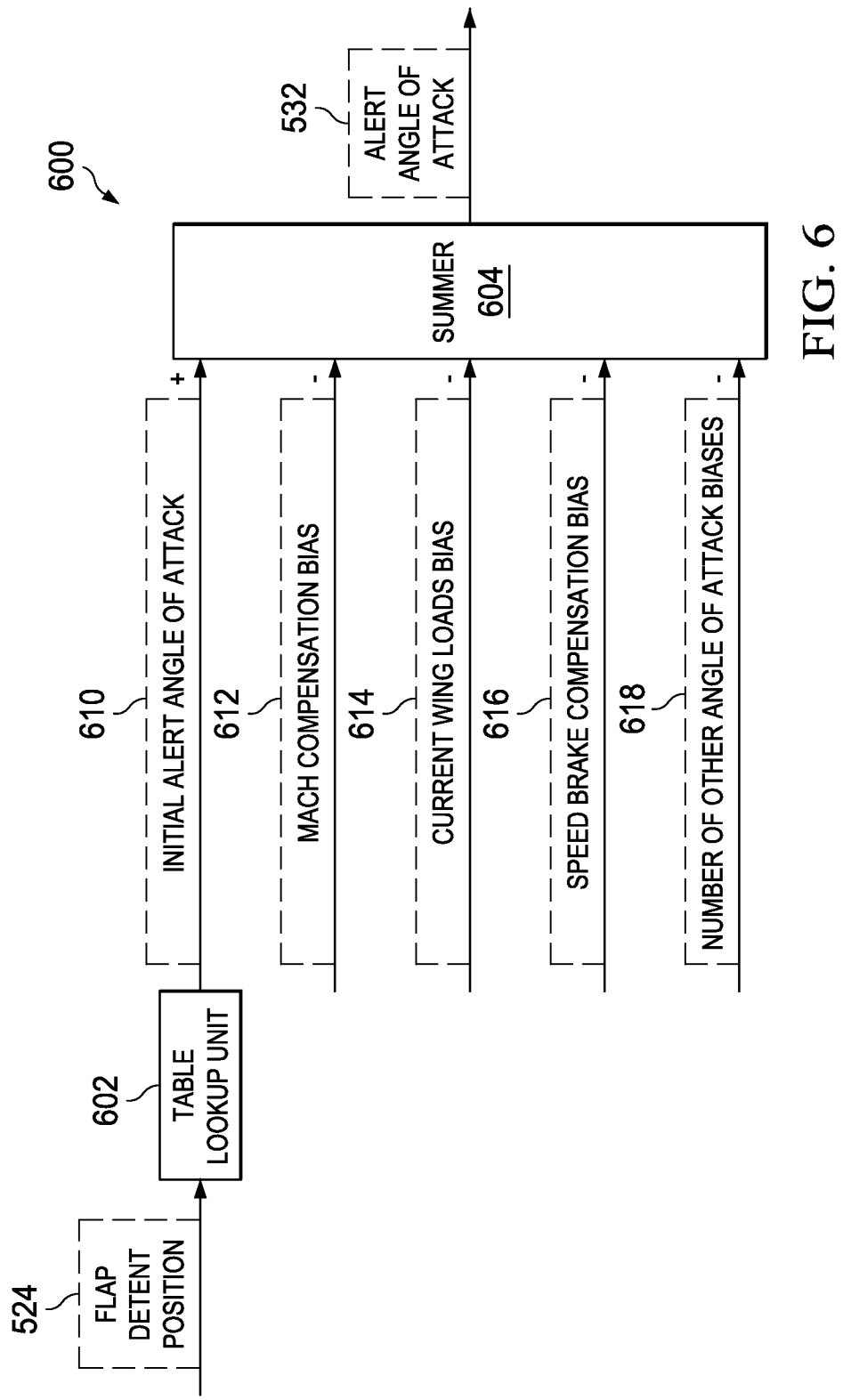
FIG. 6 is an illustration of logic for identifying an alert angle of attack in accordance with an illustrative embodiment.

Turning now to FIG. 6, an illustration of logic for identifying an alert angle of attack is depicted in accordance with an illustrative embodiment. In this illustrative example, logic 600 is configured to identify alert angle of attack 532 from FIG. 5. Logic 600 may be implemented in threshold generator 224 in FIG. 2.

As depicted, logic 600 includes table lookup unit 602, and summer 604. Table lookup unit 602 receives flap detent position 524 as input and a table to identify initial alert angle of attack 610. This table may be, for example, without limitation, one of number of tables 251 in FIG. 2. Initial alert angle of attack 610 is sent as input into summer 604, along with Mach compensation bias 612, current wing loads bias 614, speed brake compensation bias 616, and number of other angle of attack biases 618.

Current wing loads bias 614 is a correction that takes into account the current external stores attached to the wings of the aircraft. Mach compensation bias 612 is a correction that takes into account a previously identified alert Mach for the aircraft. The generation of Mach compensation bias 612 is described in greater detail in FIG. 7 below.

Speed brake compensation bias 616 is a correction for a speed brake for the aircraft. Number of other angle of attack biases 618 is a correction based on a number of factors including, but not limited to, the positions of flats and slats on the aircraft, the thrust being generated by the aircraft, and/or other types of factors.

Summer 604 is configured to subtract the Mach compensation bias 612, subtract current wing loads bias 614, subtract speed brake compensation bias 616, and subtract number of other angle of attack biases 618 from initial alert angle of attack 610 to generate alert angle of attack 532. In this manner, alert angle of attack 532 is a corrected alert angle of attack.

Figure 7:
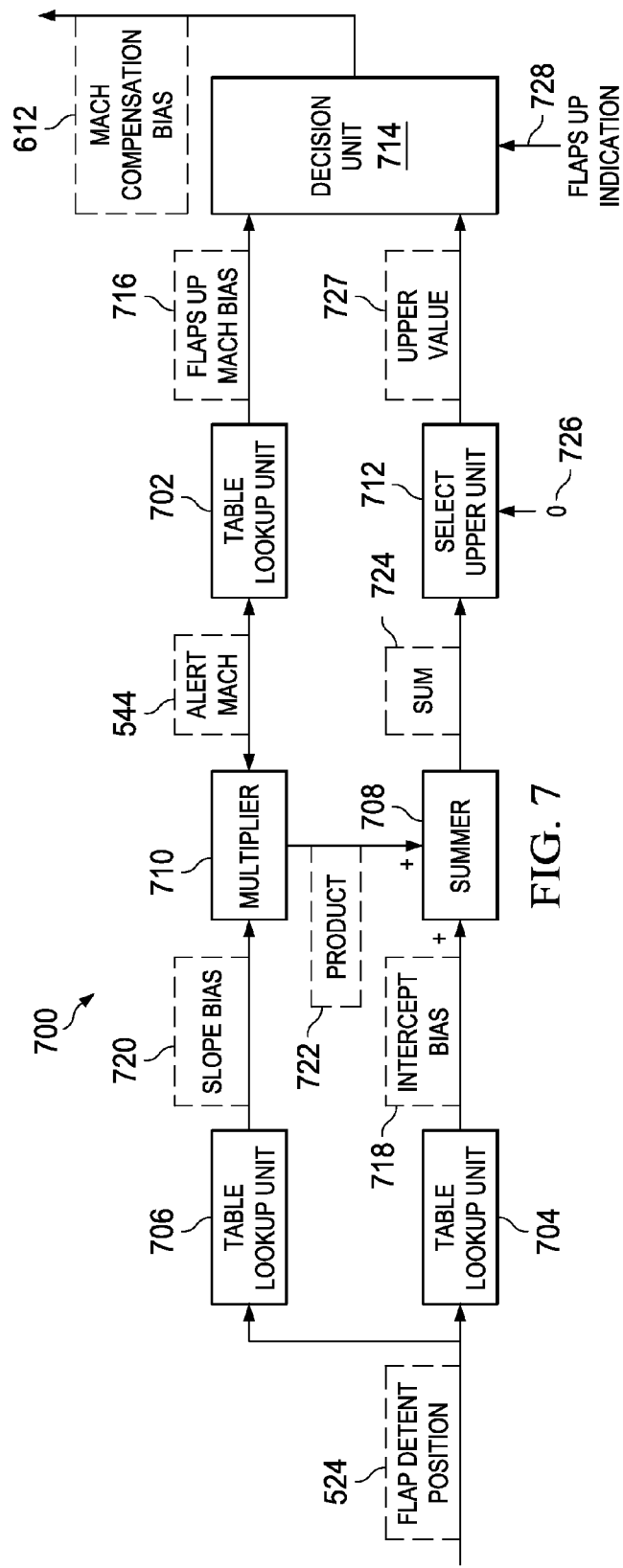
FIG. 7 is an illustration of logic used to identify a Mach compensation bias in accordance with an illustrative embodiment.

With reference now to FIG. 7, an illustration of logic used to identify a Mach compensation bias is depicted in accordance with an illustrative embodiment. In this illustrative example, logic 700 is configured to identify Mach compensation bias 612 in FIG. 6. Logic 700 may be implemented in threshold generator 224 in FIG. 2.

As depicted, logic 700 includes table lookup unit 702, table lookup unit 704, table lookup unit 706, summer 708, multiplier 710, select upper unit 712, and decision unit 714. Table lookup unit 702 is configured to receive alert Mach 544 as input. Table lookup unit 702 uses alert Mach 544 and a table to identify flaps up Mach bias 716. This table may be, for example, without limitation, one of number of tables 251 in FIG. 2.

Both table lookup unit 704 and table lookup unit 706 are configured to receive flap detent position 524 as an input. Table lookup unit 704 uses flap detent position 524 and a table to identify intercept bias 718. This table may be, for example, without limitation, one of number of tables 251 in FIG. 2. Table lookup unit 706 uses flap detent position 524 and a table to identify slope bias 720. This table may also be, for example, without limitation, one of number of tables 251 in FIG. 2. Intercept bias 718 and slope bias 720 are values used at biases that correspond to the flaps of the aircraft being in a down position.

Slope bias 720 and alert Mach 544 are sent into multiplier 710 as inputs. Multiplier 710 multiplies slope bias 720 by alert Mach 544 to generate product 722. Product 722 and intercept bias 718 are sent into summer 708 as inputs. Summer 708 adds intercept bias 718 and product 722 to each other to generate sum 724. Sum 724 is sent into select upper unit 712 as input. Select upper unit 712 is configured to select the greater value of sum 724 and zero value 726 and output this value as upper value 727.

Select upper unit 712 sends upper value 727 to decision unit 714. Decision unit 714 also receives flaps up Mach bias 716. Decision unit 714 uses flaps up indication 728 to determine whether to output flaps up Mach bias 716 or upper value 727 as Mach compensation bias 612. Mach compensation bias 612 is output from decision unit 714 and sent into summer 604 in FIG. 6.

In this manner, alert Mach 544 from FIG. 5 is used as feedback in identifying Mach compensation bias 612, and thereby alert angle of attack 532. In other words, a previously identified alert Mach 544 in FIG. 5 is used as feedback in identifying a next Mach compensation bias 612 in FIG. 7 and thereby, a next alert angle of attack 532 in FIG. 6.

Figure 8:
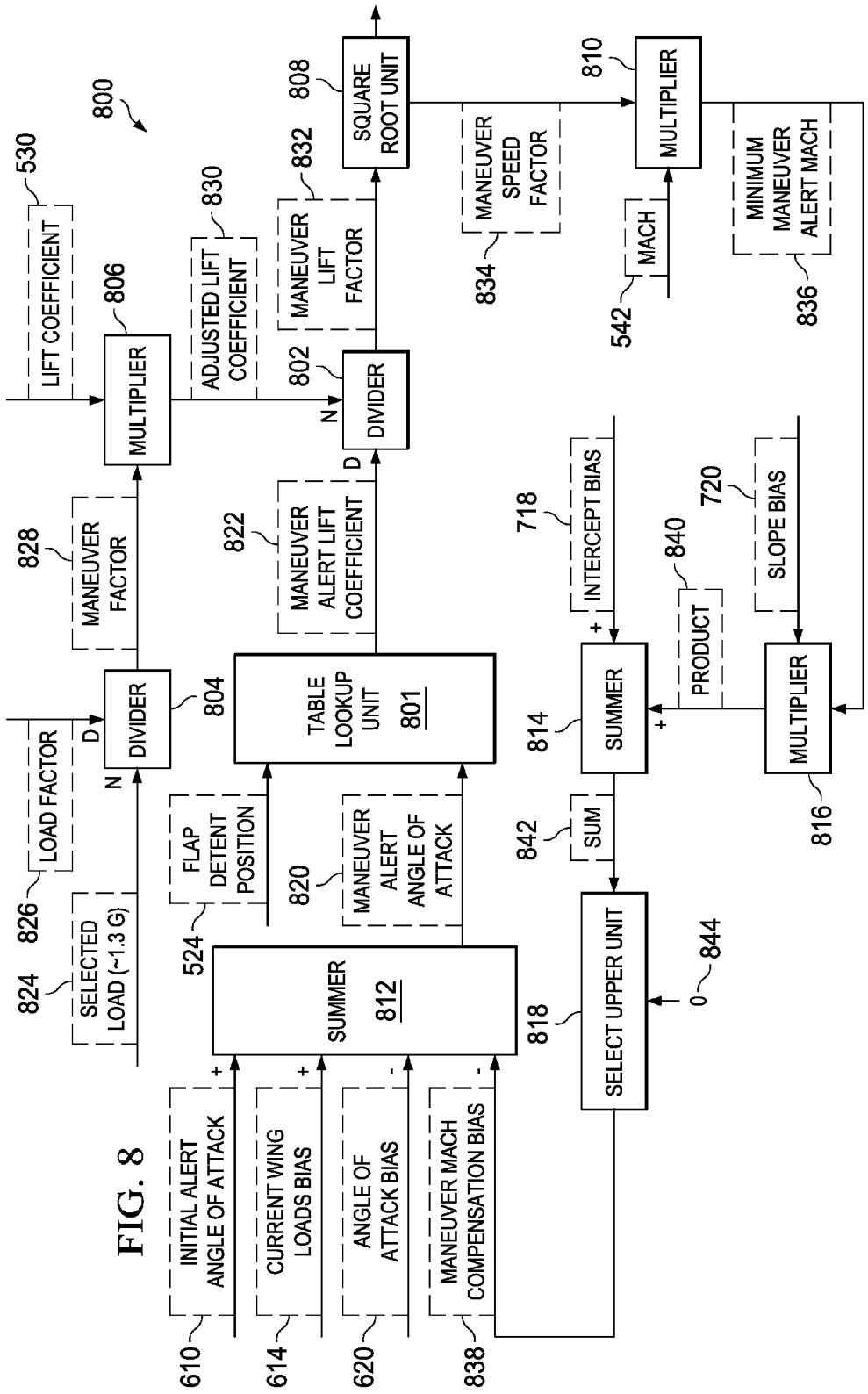
FIG. 8 is an illustration of logic for identifying a minimum maneuver speed during a turning maneuver in accordance with an illustrative embodiment.

With reference now to FIG. 8, an illustration of logic for identifying a minimum maneuver speed during a turning maneuver is depicted in accordance with an illustrative embodiment. In this illustrative example, logic 800 is configured to identify a minimum maneuver speed when the aircraft is performing a maneuver, and in particular a turning maneuver. Logic 800 may be implemented in threshold generator 224 in FIG. 2.

As depicted in this example, logic 800 includes table lookup unit 801, divider 802, divider 804, multiplier 806, square root unit 808, multiplier 810, summer 812, summer 814, multiplier 816, and select upper unit 818. Table lookup unit 801 is configured to receive flap detent position 524 and maneuver alert angle of attack 820 as inputs. Maneuver alert angle of attack 820 is an example of one implementation for alert angle of attack 242 in FIG. 2, but with respect to a maneuver.

Table lookup unit 801 uses flap detent position 524, maneuver alert angle of attack 820, and a table to identify maneuver alert lift coefficient 822. This table may be, for example, without limitation, one of number of tables 251 in FIG. 2. Maneuver alert lift coefficient 822 is an example of one implementation for alert lift coefficient 244 in FIG. 2, but with respect to a maneuver. Maneuver alert lift coefficient 822 is an input into divider 802.

Additionally, divider 804 is configured to receive selected load 824 and load factor 826 as inputs. Selected load 824 is a load that represents the minimum maneuvering capability of the aircraft. For example, the selected load 824 may be about 1.3 g in this illustrative example, which may represent a minimum maneuvering capability of about 40 degrees. Load factors above selected load 824 may be obtained by flying faster than the minimum maneuver speed. Load factor 826 is the ratio of the lift of the aircraft to the weight of the aircraft. In some cases, other factors may be taken into account in the calculation of load factor 826. Divider 804 divides selected load 824 by load factor 826 to generate maneuver factor 828.

Lift coefficient 530 from FIG. 5 and maneuver factor 828 are sent into multiplier 806 as inputs. Multiplier 806 multiplies lift coefficient 530 by maneuver factor 828 to generate adjusted lift coefficient 830. Adjusted lift coefficient 830 is sent into divider 802 as an input.

Divider 802 divides adjusted lift coefficient 830 by maneuver alert lift coefficient 822 to generate maneuver lift factor 832. As depicted, square root unit 808 is configured to receive maneuver lift factor 832 and output the square root of maneuver lift factor 832 as maneuver speed factor 834. Maneuver speed factor 834 is received by multiplier 810 and multiplied by Mach 542 to generate minimum maneuver alert Mach 836. Minimum maneuver Mach 836 is an example of one implementation for alert speed 246 in FIG. 2, but with respect to a maneuver for selected load 824.

As depicted in this example, minimum maneuver alert Mach 836 is used as feedback in identifying maneuver alert angle of attack 820. Maneuver alert angle of attack 820 is output from summer 812. Summer 812 is configured to sum initial alert angle of attack 610 from FIG. 6, the negative of maneuver Mach compensation bias 838, current wing loads bias 614 from FIG. 6, and the negative of angle of attack bias 620 from FIG. 6 together to generate maneuver alert angle of attack 820. Maneuver Mach compensation bias 838 is generated using minimum maneuver alert Mach 836.

In particular, multiplier 816 is configured to multiply slope bias 720 from FIG. 7 by minimum maneuver alert Mach 836 to generate product 840. Summer 814 is configured to sum intercept bias 718 from FIG. 7 and product 840 to generate sum 842. Select upper unit 818 is configured to select the upper value of sum 842 and zero value 844 and output this upper value as maneuver Mach compensation bias 838.

With reference now to FIG. 9, an illustration of logic for identifying an alert speed is depicted in accordance with an illustrative embodiment. In this illustrative example, logic 900 is configured to identify an alert speed for the aircraft in knots. Logic 900 may be implemented in threshold generator 224 in FIG. 2.

As depicted, logic 900 includes filter 902 and multiplier 904. Filter 902 is configured to receive airspeed 906 as an input. In this illustrative example, airspeed 906 is a true airspeed for the aircraft in knots. Filter 902 may be, for example, a low pass filter. In particular, filter 902 may be a first order low pass filter.

Filter 902 uses airspeed 906 to generate filtered airspeed 908. Filtered airspeed 908 is sent as input into multiplier 904 along with speed factor 538 from FIG. 5. Multiplier 904 multiplies speed factor 538 and filtered airspeed 908 to generate alert airspeed 910. In some cases, alert airspeed 910 may be used as a speed threshold, such as, for example, speed threshold 234 in FIG. 2, for generating alerts.

In other illustrative examples, when the aircraft is performing a maneuver, filtered airspeed 908 is multiplied by maneuver speed factor 834 from FIG. 8 to generate a maneuver alert airspeed. This maneuver alert airspeed may also be used as a speed threshold for generating alerts.

Turning now to FIG. 10, an illustration of logic for generating an alert is depicted in accordance with an illustrative example. Logic 1000 is an example of one manner in which an alert may be generated. Logic 1000 may be implemented in alert generator 226 in FIG. 2.

As depicted, logic 1000 includes summer 1002 and comparison unit 1004. Summer 1002 receives filtered angle of attack 522 from FIG. 5 and alert angle of attack 532 from FIG. 5 as inputs. In this manner, alert generator 226 in FIG. 2 may receive alert angle of attack 532 as angle of attack threshold 231 in FIG. 2.

Summer 1002 sums filtered angle of attack 522 and the negative of alert angle of attack 532 to generate sum 1006. Comparison unit 1004 is configured to compare sum 1006 to zero. If sum 1006 is greater than zero, then alert 1008 is generated. Alert 1008 is an example of one implementation for alert 230 in FIG. 2. Alert 230 may be, for example, without limitation, a command that is sent to a stick shaker in the aircraft, such as stick shaker 422 in FIG. 4.

The illustrations of logic 500 in FIG. 5, logic 600 in FIG. 6, logic 700 in FIG. 7, logic 800 in FIG. 8, logic 900 in FIG. 9, and logic 1000 in FIG. 10 are not meant to imply physical or architectural limitations to the manner in which an illustrative embodiment may be implemented. Other components in addition to or in place of the ones illustrated may be used. Some components may be optional.

Also, the blocks are presented to illustrate some logical components. One or more of these blocks may be combined, divided, or combined and divided into different blocks when implemented in an illustrative embodiment. Further, one or more of the logics in FIGS. 5-10 may be combined with each other.

Turning now to FIG. 11, an illustration of a table for identifying a lift coefficient is depicted in accordance with an illustrative embodiment. In this illustrative example, table 1100 is an example of one implementation for a table in number of tables 251 in FIG. 2. In particular, table 1100 may be an example of one implementation for a table that may be used by table lookup unit 504 in FIG. 5, table lookup unit 506 in FIG. 5, and table lookup unit 801 in FIG. 8.

In these illustrative examples, rows 1102 correspond to angle of attack in degrees, while columns 1104 correspond to flap detent positions. The table lookup unit may use inputs in the form of an angle of attack and a flap detent position to identify a particular lift coefficient in lift coefficients 1106 within table 1100. In some illustrative examples, when the inputs into the table lookup unit are not included in the values in rows 1102 and/or the values in columns 1104, the table lookup unit may use interpolation to identify the correct lift coefficient.

The illustration of table 1100 is not meant to imply limitations to the manner in which a table may be implemented for a table lookup unit. In this illustrative example, only four rows and columns are depicted. However, in other illustrative examples, other numbers of rows and columns may be included in table 1100.

Figure 12:
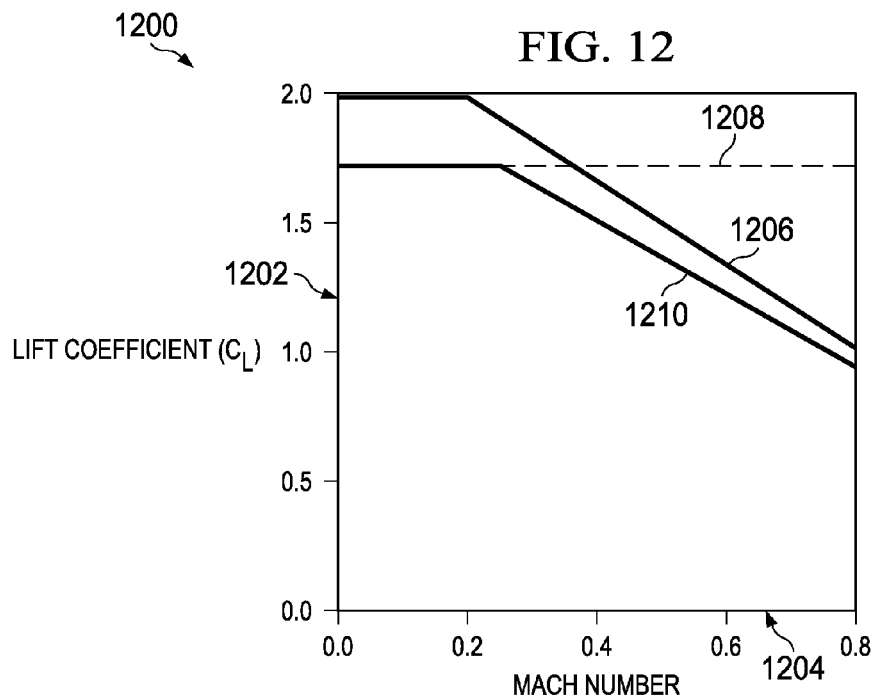
FIG. 12 is an illustration of a graph of lift coefficients versus Mach numbers in accordance with an illustrative embodiment.

With reference now to FIG. 12, an illustration of a graph of lift coefficients versus Mach numbers is depicted in accordance with an illustrative embodiment. In this illustrative example, graph 1200 comprises vertical axis 1202 and horizontal axis 1204. Vertical axis 1202 represents lift coefficient values. Horizontal axis 1204 represents Mach number values.

Line 1206 corresponds to the stall lift coefficient for an aircraft with respect to a Mach number. As illustrated, the stall lift coefficient for the aircraft changes as the Mach number for the aircraft changes.

Line 1208 corresponds to the alert lift coefficient that may be generated by some currently available alert systems for use in generating alerts when the aircraft reaches a potential stall condition. As depicted, the alert lift coefficient used remains fixed during flight and does not change as the Mach number changes. When this type of alert lift coefficient is used, the alert may not be generated until after the stall lift coefficient has been reached by an aircraft for Mach numbers greater than about 0.38. In other words, the alert may not be generated until after the aircraft has already stalled.

Line 1210 corresponds to the alert lift coefficient that may be generated by stall management system 216 in FIG. 2. In particular, line 1210 may correspond to alert lift coefficient 244. As depicted, alert lift coefficient 244 changes as the stall lift coefficient changes. In particular, the alert lift coefficient is configured to remain about ten percent lower than the stall lift coefficient at all times.

By using an alert lift coefficient that is configured to change as the Mach number for the aircraft changes, alerts may always be generated prior to aircraft stalling. In this manner, an operator may have sufficient time to perform a number of maneuvers to prevent or reduce the possibility of the aircraft stalling.

Figure 13:
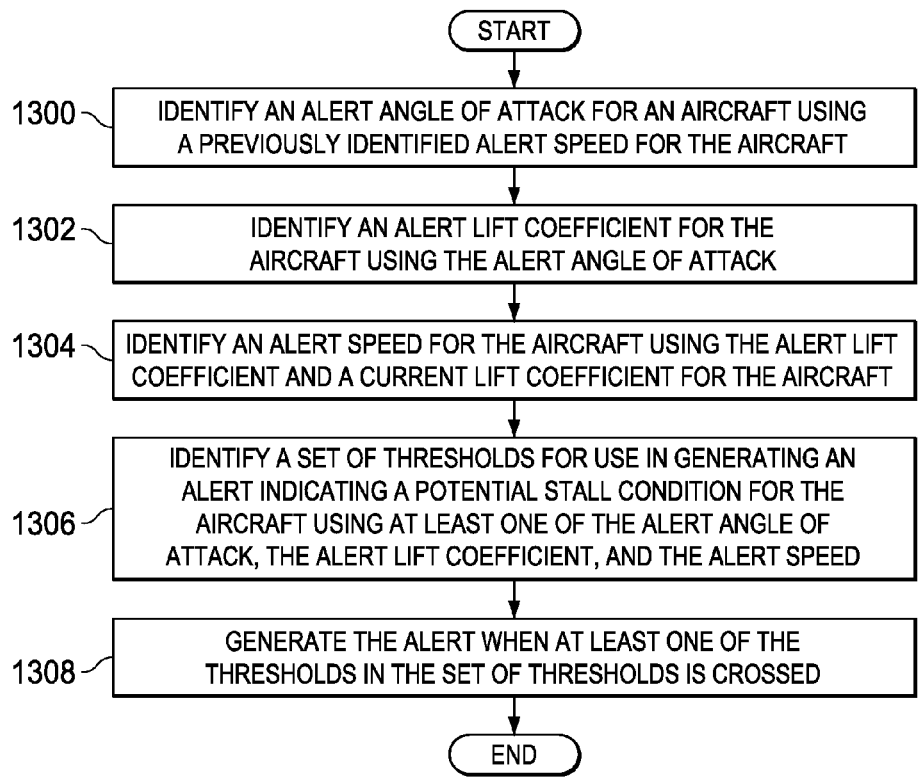
FIG. 13 is an illustration of a process for managing the flight of an aircraft in the form of a flowchart in accordance with an illustrative embodiment.

Turning now to FIG. 13, an illustration of a process for managing the flight of an aircraft in the form of a flowchart is depicted in accordance with an illustrative embodiment. The process illustrated in FIG. 13 may be implemented in aircraft 202 using stall management system 216 in FIG. 2.

The process begins by identifying an alert angle of attack for an aircraft using a previously identified alert speed for the aircraft (operation 1300). In operation 1300, the alert angle of attack may be identified using an initial alert angle of attack and a plurality of biases. These biases may include, for example, without limitation, at least one of an angle of attack bias, a Mach compensation bias, a current wing loads bias, and a speed brake compensation bias. In one illustrative example, the initial alert angle of attack is identified using a flap detent position and a table.

The process then identifies an alert lift coefficient for the aircraft using the alert angle of attack (operation 1302). In operation 1302, the alert lift coefficient may be identified using the flap detent position and a table.

Thereafter, the process identifies an alert speed for the aircraft using the alert lift coefficient and a current lift coefficient for the aircraft (operation 1304). The alert speed may be, for example, an alert Mach. In other words, the alert speed is represented as a Mach number. Further, the alert speed may be used as feedback for identifying a next alert angle of attack.

The process then identifies a set of thresholds for use in generating an alert indicating a potential stall condition for the aircraft using at least one of the alert angle of attack, the alert lift coefficient, and the alert speed (operation 1306). The set of thresholds may include, for example, an angle of attack threshold, a lift coefficient threshold, and/or a speed threshold. In some cases, the angle of attack threshold, the lift coefficient threshold, and the speed threshold may be the alert angle of attack, the alert lift coefficient, and the alert speed, respectively.

Next, the process generates the alert when at least one of the thresholds in the set of thresholds is crossed (operation 1308), with the process terminating thereafter. In operation 1308, the alert may be generated when, for example, at least one of an angle of attack of the aircraft is greater than the angle of attack threshold, the current lift coefficient of the aircraft is greater than the alert lift coefficient, and a speed of the aircraft is below the speed threshold.

In FIG. 13, using the alert speed as feedback in identifying the alert angle of attack allows the alert lift coefficient identified using the alert angle of attack to be adjusted in response to a number of changes in a current state of the aircraft. In other words, the alert angle of attack, the alert lift coefficient, and the alert speed may be adjusted according to changes in the current state of the aircraft. In this manner, an alert that the aircraft has reached a potential stall condition may be generated prior to the aircraft actually stalling.

The flowcharts, logics, and block diagrams in the different depicted embodiments illustrate the architecture, functionality, and operation of some possible implementations of apparatus and methods in an illustrative embodiment. In this regard, each block in the flowcharts, logics, or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts, logics, or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart, logic, or block diagram.

Figure 14:
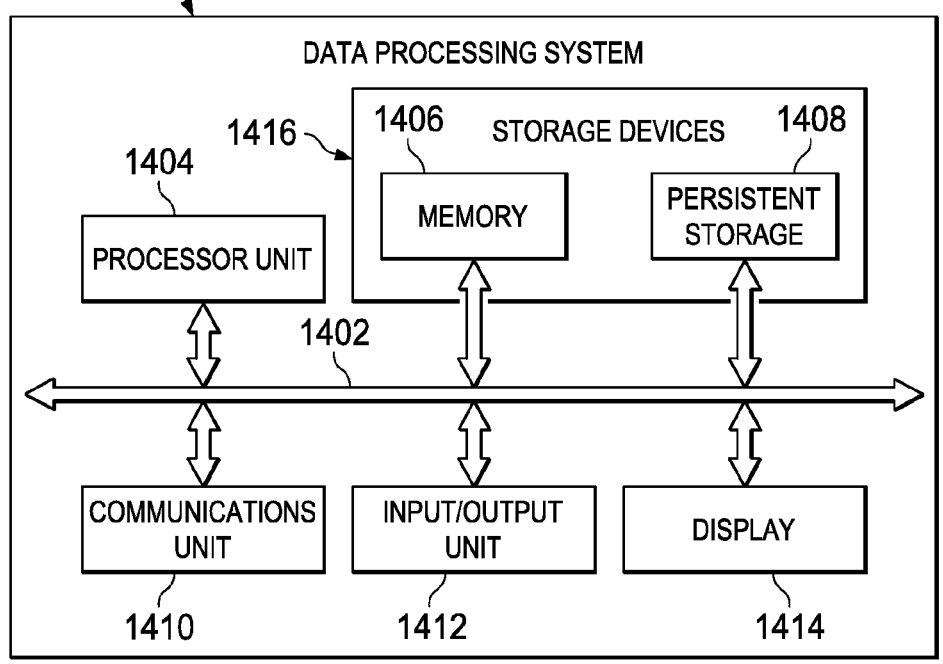
FIG. 14 is an illustration of a data processing system in accordance with an illustrative embodiment.
Figure 14:
Figure 14:
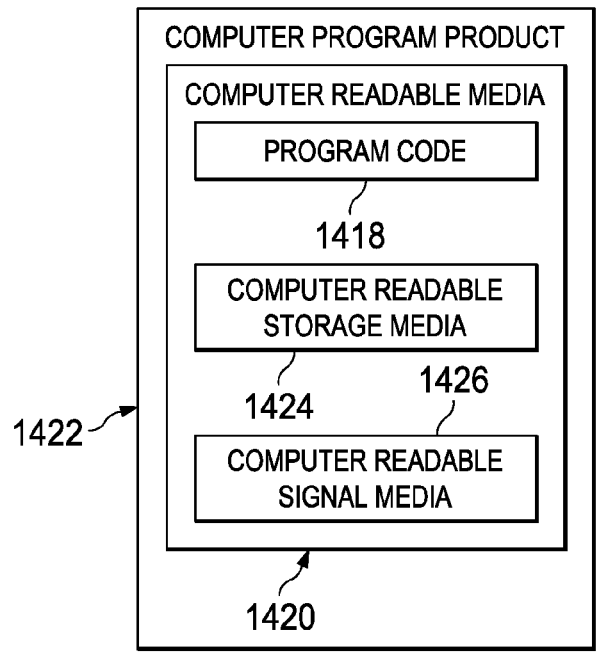

Turning now to FIG. 14, an illustration of a data processing system is depicted in accordance with an illustrative embodiment. In this illustrative example, data processing system 1400 may be used to implement one or more computers in computer system 222 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414.

Processor unit 1404 serves to execute instructions for software that may be loaded into memory 1406. Processor unit 1404 may be a number of processors, a multi-processor core, or some other type of processor, depending on the particular implementation. Further, processor unit 1404 may be implemented using a number of heterogeneous processor systems in which a main processor is present with secondary processors on a single chip. As another illustrative example, processor unit 1404 may be a symmetric multi-processor system containing multiple processors of the same type.

Memory 1406 and persistent storage 1408 are examples of storage devices 1416. A storage device is any piece of hardware that is capable of storing information such as, for example, without limitation, data, program code in functional form, and/or other suitable information either on a temporary basis and/or a permanent basis. Storage devices 1416 also may be referred to as computer readable storage devices in these examples. Memory 1406, in these examples, may be, for example, a random access memory or any other suitable volatile or non-volatile storage device. Persistent storage 1408 may take various forms, depending on the particular implementation.

For example, without limitation, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408.

Communications unit 1410, in these examples, provides for communications with other data processing systems or devices. In these examples, communications unit 1410 is a network interface card. Communications unit 1410 may provide communications through the use of either or both physical and wireless communications links.

Input/output unit 1412 allows for input and output of data with other devices that may be connected to data processing system 1400. For example, input/output unit 1412 may provide a connection for user input through a keyboard, a mouse, and/or some other suitable input device. Further, input/output unit 1412 may send output to a printer. Display 1414 provides a mechanism to display information to a user.

Instructions for the operating system, applications, and/or programs may be located in storage devices 1416, which are in communication with processor unit 1404 through communications framework 1402. In these illustrative examples, the instructions are in a functional form on persistent storage 1408. These instructions may be loaded into memory 1406 for execution by processor unit 1404. The processes of the different embodiments may be performed by processor unit 1404 using computer-implemented instructions, which may be located in a memory, such as memory 1406.

These instructions are referred to as program code, computer usable program code, or computer readable program code that may be read and executed by a processor in processor unit 1404. The program code in the different embodiments may be embodied on different physical or computer readable storage media, such as memory 1406 or persistent storage 1408.

Program code 1418 is located in a functional form on computer readable media 1420 that is selectively removable and may be loaded onto or transferred to data processing system 1400 for execution by processor unit 1404. Program code 1418 and computer readable media 1420 form computer program product 1422 in these examples. In one example, computer readable media 1420 may be computer readable storage media 1424 or computer readable signal media 1426.

Computer readable storage media 1424 may include, for example, without limitation, an optical or magnetic disk that is inserted or placed into a drive or other device that is part of persistent storage 1408 for transfer onto a storage device, such as a hard drive, that is part of persistent storage 1408. Computer readable storage media 1424 also may take the form of a persistent storage, such as a hard drive, a thumb drive, or a flash memory, that is connected to data processing system 1400. In some instances, computer readable storage media 1424 may not be removable from data processing system 1400.

In these examples, computer readable storage media 1424 is a physical or tangible storage device used to store program code 1418 rather than a medium that propagates or transmits program code 1418. Computer readable storage media 1424 is also referred to as a computer readable tangible storage device or a computer readable physical storage device. In other words, computer readable storage media 1424 is a media that can be touched by a person.

Alternatively, program code 1418 may be transferred to data processing system 1400 using computer readable signal media 1426. Computer readable signal media 1426 may be, for example, without limitation, a propagated data signal containing program code 1418. For example, computer readable signal media 1426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1418 may be downloaded over a network to persistent storage 1408 from another device or data processing system through computer readable signal media 1426 for use within data processing system 1400. For instance, program code stored in a computer readable storage medium in a server data processing system may be downloaded over a network from the server to data processing system 1400. The data processing system providing program code 1418 may be a server computer, a client computer, or some other device capable of storing and transmitting program code 1418.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1404 may take the form of a hardware unit that has circuits that are manufactured or configured for a particular use. This type of hardware may perform operations without needing program code to be loaded into a memory from a storage device to be configured to perform the operations.

For example, when processor unit 1404 takes the form of a hardware unit, processor unit 1404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, without limitation, a programmable logic array, a field programmable logic array, a field programmable gate array, and other suitable hardware devices. With this type of implementation, program code 1418 may be omitted, because the processes for the different embodiments are implemented in a hardware unit.

In still another illustrative example, processor unit 1404 may be implemented using a combination of processors found in computers and hardware units. Processor unit 1404 may have a number of hardware units and a number of processors that are configured to run program code 1418. With this depicted example, some of the processes may be implemented in the number of hardware units, while other processes may be implemented in the number of processors.

In another example, a bus system may be used to implement communications framework 1402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, without limitation, memory 1406 or a cache, such as found in an interface and memory controller hub that may be present in communications framework 1402.

Thus, one or more of the illustrative embodiments may provide more accurate identification of speeds at which an aircraft may operate. The different illustrative embodiments take into account changes in lift for an aircraft during different phases of flight. In particular, the illustrative embodiments recognize and take into account that the lift of the aircraft may change as various conditions for the aircraft change. By taking into account these different conditions, an aircraft may be able to operate at airports with shorter runways as compared to currently used systems.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing an aircraft during flight, the method comprising:
    identifying an alert angle of attack for the aircraft using a previously identified alert speed for the aircraft;
    identifying an alert lift coefficient for the aircraft using the alert angle of attack for the aircraft; and
    identifying an alert speed for the aircraft using the alert lift coefficient for the aircraft and a current lift coefficient for the aircraft.

2. The method of claim 1 further comprising:
    identifying a set of thresholds for use in generating an alert indicating a potential stall condition for the aircraft using at least one of the alert angle of attack, the alert lift coefficient, and the alert speed.

3. The method of claim 2, wherein the step of identifying the set of thresholds for use in generating the alert indicating the potential stall condition for the aircraft comprises:
    identifying at least one of an angle of attack threshold using the alert angle of attack, a lift coefficient threshold using the alert lift coefficient, and a speed threshold using the alert speed.

4. The method of claim 3 further comprising:
    generating the alert when at least one of an angle of attack of the aircraft is greater than the angle of attack threshold, the current lift coefficient of the aircraft is greater than the lift coefficient threshold, and a speed of the aircraft is below the speed threshold; and
    sending the alert to a stick shaker in the aircraft.

5. The method of claim 1, wherein the step of identifying the alert angle of attack for the aircraft using the previously identified alert speed for the aircraft comprises:
    identifying an initial alert angle of attack using a flap detent position and a table;
    identifying a Mach compensation bias using the previously identified alert speed for the aircraft; and
    identifying the alert angle of attack for the aircraft using the initial alert angle of attack and the Mach compensation bias.

6. The method of claim 5, wherein the step of identifying the alert angle of attack for the aircraft using the initial alert angle of attack and the Mach compensation bias comprises:
    identifying the alert angle of attack for the aircraft using the initial alert angle of attack, the Mach compensation bias, and at least one of a current wing loads bias, a speed brake compensation bias, and an angle of attack bias.

7. The method of claim 1, wherein the step of identifying the alert lift coefficient for the aircraft using the alert angle of attack for the aircraft comprises:
    identifying the alert lift coefficient for the aircraft using the alert angle of attack for the aircraft, a flap detent position, and a table.

8. The method of claim 1, wherein the step of identifying the alert speed for the aircraft using the alert lift coefficient for the aircraft and the current lift coefficient for the aircraft comprises:
    identifying the current lift coefficient for the aircraft using a corrected angle of attack, a flap detent position, and a table;
    dividing the current lift coefficient by the alert lift coefficient to generate a lift factor;
    identifying a square root of the lift factor to generate a speed factor; and
    identifying the alert speed using the speed factor and a current speed for the aircraft, wherein the alert speed is an alert Mach for the aircraft and the current speed is a current Mach for the aircraft.

9. The method of claim 1, wherein the step of identifying the alert lift coefficient for the aircraft using the alert angle of attack for the aircraft comprises:
identifying the alert lift coefficient for the aircraft using the alert angle of attack for the aircraft in which the alert lift coefficient is substantially a selected percentage lower than a current stall lift coefficient for the aircraft.

10. The method of claim 1, wherein the steps of identifying the alert angle of attack for the aircraft using the previously identified alert speed for the aircraft; identifying the alert lift coefficient for the aircraft using the alert angle of attack for the aircraft; and identifying the alert speed for the aircraft using the alert lift coefficient for the aircraft and the current lift coefficient for the aircraft are performed for a maneuver for the aircraft.

11. A method for indicating a potential stall condition for an aircraft during flight, the method comprising:
identifying an alert lift coefficient for the aircraft;
adjusting the alert lift coefficient in response to a number of changes in a current state of the aircraft; and
identifying a set of thresholds for use in generating an alert indicating that the aircraft has reached the potential stall condition using the alert lift coefficient.

12. The method of claim 11 further comprising:
generating the alert, wherein the alert comprises at least one of a tactile alert, a visual alert, an audible alert, and a message.

13. A stall management system comprising:
a threshold generator configured to identify an alert angle of attack for an aircraft using a previously identified alert speed for the aircraft; identify an alert lift coefficient for the aircraft using the alert angle of attack for the aircraft; and identify an alert speed for the aircraft using the alert lift coefficient for the aircraft and a current lift coefficient for the aircraft.

14. The stall management system of claim 13, wherein the threshold generator is configured to identify a set of thresholds for use in generating an alert indicating a potential stall condition for the aircraft using at least one of the alert angle of attack, the alert lift coefficient, and the alert speed.

15. The stall management system of claim 14, wherein the threshold generator is configured to identify the set of thresholds for use in generating the alert indicating the potential stall condition for the aircraft by identifying at least one of an angle of attack threshold using the alert angle of attack, a lift coefficient threshold using the alert lift coefficient, and a speed threshold using the alert speed.

16. The stall management system of claim 15 further comprising:
an alert generator configured to receive the set of thresholds from the threshold generator and generate the alert when at least one of an angle of attack of the aircraft is greater than the angle of attack threshold, the current lift coefficient of the aircraft is greater than the lift coefficient threshold, and a speed of the aircraft is below the speed threshold and send the alert to a stick shaker in the aircraft.

17. The stall management system of claim 13, wherein the threshold generator is configured to identify the alert angle of attack by identifying an initial alert angle of attack using a flap detent position and a table in a number of tables; identify a Mach compensation bias using the previously identified alert speed for the aircraft; and
identify the alert angle of attack for the aircraft using the initial alert angle of attack and the Mach compensation bias.

18. The stall management system of claim 17, wherein the threshold generator is configured to identify the alert angle of attack for the aircraft by identifying the alert angle of attack for the aircraft using the initial alert angle of attack, the Mach compensation bias, and at least one of a current wing loads bias, a speed brake compensation bias, and an angle of attack bias.

19. The stall management system of claim 13, wherein the threshold generator is configured to identify the alert lift coefficient for the aircraft using the alert angle of attack for the aircraft, a flap detent position, and a table.

20. The stall management system of claim 13, wherein the threshold generator is further configured to perform the steps of identifying the alert angle of attack for the aircraft using the previously identified alert speed for the aircraft; identifying the alert lift coefficient for the aircraft using the alert angle of attack for the aircraft; and identifying the alert speed for the aircraft using the alert lift coefficient for the aircraft and the current lift coefficient for the aircraft for a maneuver for the aircraft.

* * * * *